United States Patent
Hashimoto

(10) Patent No.: US 8,385,918 B2
(45) Date of Patent: Feb. 26, 2013

(54) RADIO COMMUNICATION SYSTEM, BASE STATION APPARATUS, TERMINAL APPARATUS, AND RADIO LINK SETTING METHOD IN RADIO COMMUNICATION SYSTEM

(75) Inventor: Masanori Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 12/788,879

(22) Filed: May 27, 2010

(65) Prior Publication Data

US 2010/0323699 A1 Dec. 23, 2010

(30) Foreign Application Priority Data

Jun. 18, 2009 (JP) ................................. 2009-144837

(51) Int. Cl.
*H04W 36/00* (2009.01)

(52) U.S. Cl. ........ 455/436; 455/446; 455/447; 455/448; 455/411

(58) Field of Classification Search .................. 455/436, 455/67.11, 67.14, 69, 446, 447, 448, 411
See application file for complete search history.

(56) References Cited

U.S. PATENT DOCUMENTS

| | | | |
|---|---|---|---|
| 2006/0002365 A1* | 1/2006 | Heino et al. | 370/349 |
| 2008/0080399 A1 | 4/2008 | Wang et al. | |
| 2008/0167003 A1* | 7/2008 | Wang et al. | 455/411 |
| 2008/0207209 A1 | 8/2008 | Katori et al. | |
| 2010/0046433 A1 | 2/2010 | Iwamura et al. | |

FOREIGN PATENT DOCUMENTS

| | | |
|---|---|---|
| EP | 2104284 | 9/2009 |
| JP | 2006-270207 | 10/2006 |
| JP | 2008-193364 | 8/2008 |
| JP | 2008-193366 | 8/2008 |
| JP | 2008-236730 | 10/2008 |
| WO | 2008/042414 | 4/2008 |
| WO | 2008/082587 | 7/2008 |
| WO | 2008/087833 | 7/2008 |

OTHER PUBLICATIONS

3GPP TS 23.002 V8.5.0 (Jun. 2009); 3rd Generation Partnership Project; Technical Specification Group Services and Systems Aspects; "Network architecture"; (Release 8); Jun. 8, 2009.

(Continued)

*Primary Examiner* — Kamran Afshar
*Assistant Examiner* — Sayed T Zewari
(74) *Attorney, Agent, or Firm* — Myers Wolin, LLC

(57) ABSTRACT

A radio communication system, including: a first and second base stations; and a terminal, the first base station includes a first position information acquisition unit which acquires position information of the first base station; a first control unit which generates a new-installation massage including the position information and indicating that the first base station is a newly installed base station and transmits the message to the second base station, transmits a signal link establishment request message to each second base station in the number capable of transmitting to the terminal as adjacent cell information when the first base station receives a new-installation response message responding to the new-installation message from the second base station, generates the adjacent cell information indicating that the second base station transmitted a signal link establishment response message is an adjacent base station.

20 Claims, 13 Drawing Sheets

OTHER PUBLICATIONS

3GPP TS 23.401 V8.6.0 (Jun. 2009); 3rd Generation Partnership Projects; Technical Specification Group Services and System Aspects; "General Packet Radio Service (GPRS) enhancements for Evolved Universal Terrestrial Radio Access Network (E-UTRAN) access"; (Release 8); Jun. 10, 2009.

3GPP TS 23.402 V8.6.0 (Jun. 2009); 3rd Generation Partnership Project; Technical Specification Group Services and System Aspects; "Architecture enhancements for non-3GPP accesses"; (Release 8); Jun. 10, 2009.

3GPPS TS 36.300 V8.9.0 (Jun. 2009); 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2; (Release 8); Jun. 18, 2009.

Extended European Search Report with Annex issued for corresponding European Patent Application No. 10164111.3, mailed Sep. 23, 2010.

Lucent Technologies; "Self-configuration and self-optimization in E-UTRAN"; Agenda Item: 7.5; 3GPP TSG RAN WG3 Meeting #53bis; R3-061482; Seoul, Korea; Oct. 10-13, 2006.

* cited by examiner

| eNB-ID | DISTANCE | HO-RELATED INFORMATION | | |
|---|---|---|---|---|
| | | CELL ID | REPORT FREQUENCY | ... |
| 001 | 0.9Km | 11 | xx MHz | |
| | | 12 | | |
| | | 13 | | |
| 002 | 1.0Km | 14 | yy MHz | |
| | | 15 | | |
| | | 16 | | |
| ... | | | | |
| 103 | 1.7Km | 53 | | |
| | | 54 | | |
| | | 55 | | |
| 104 | 1.7Km | 56 | | |
| | | 57 | | |
| | | 58 | | |
| 201 | 1.9Km | 71 | | |
| | | 72 | | |
| | | 73 | | |

MAXIMUM 12

12 OR MORE EXIST, SO INCLUSION IN LIST NOT POSSIBLE

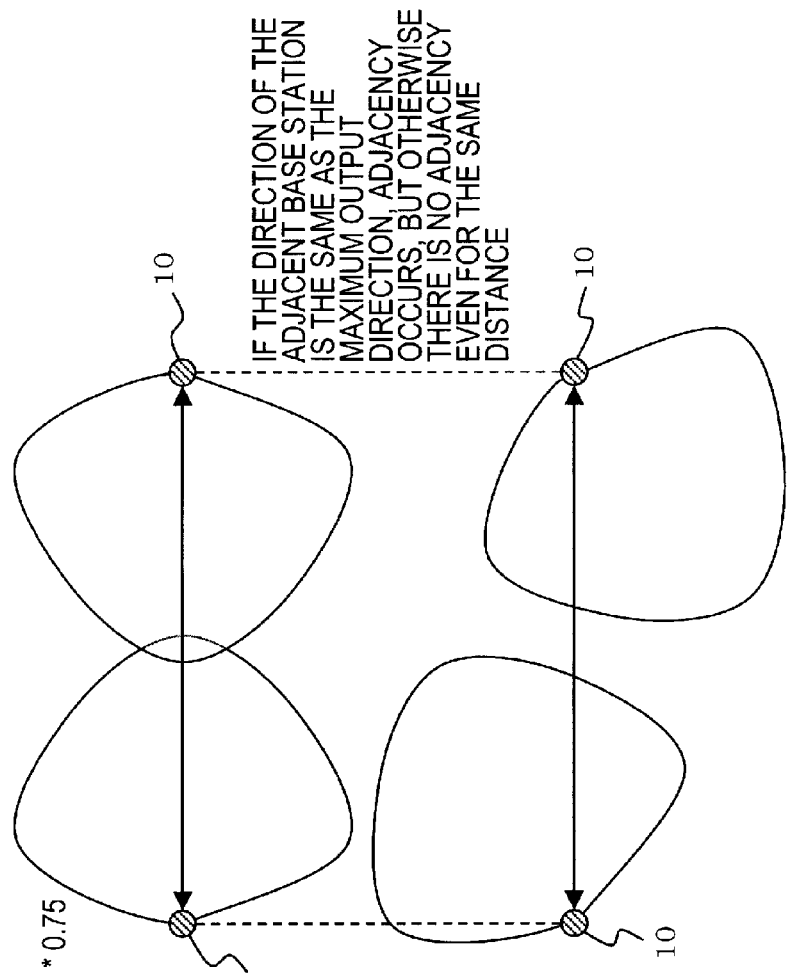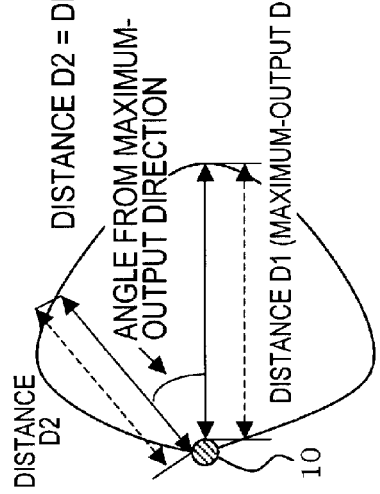

FIG.9

| COMPASS DIRECTION (0° IS NORTH) | | OUTPUT |
|---|---|---|
| 0° | CELL 3 | 98% |
| 10° | | 90% |
| ... | CELL 1 | ... |
| 90° | | 90% |
| 100° | | 98% |
| 110° | | 100% (MAXIMUM OUTPUT) |
| 120° | | 98% |
| 130° | | 90% |
| 140° | | 75% |
| ... | CELL 2 | ... |
| 220° | | 98% |
| 230° | | 100% (MAXIMUM OUTPUT) |
| 240° | | 98% |
| ... | CELL 3 | ... |
| 340° | | 98% |
| 350° | | 100% (MAXIMUM OUTPUT) |

131

RADIO COMMUNICATION SYSTEM, BASE STATION APPARATUS, TERMINAL APPARATUS, AND RADIO LINK SETTING METHOD IN RADIO COMMUNICATION SYSTEM

CROSS-REFERENCE TO RELATED APPLICATION

This application is based upon and claims the benefit of priority of the prior Japanese Patent Application No. 2009-144837, filed on Jun. 18, 2009, the entire contents of which are incorporated herein by reference.

FIELD

The embodiments discussed herein are related to a radio communication system, a base station apparatus, a terminal apparatus, and a communication link setting method in a radio communication system.

BACKGROUND

There is a 3G cellular network as a network performing a portable telephone service (see for example the following Non-Patent document 1). FIG. 12 illustrates an example of the configuration of the 3G cellular network. The 3G cellular network includes a radio access network (RAN), and a core network (CN) which provides voice service and packet service. The radio access network includes base station apparatuses (NodeB) 100-1 to 100-7 which perform direct radio communication with terminal apparatuses, and radio network controllers (RNCs) 101-1 to 101-3 which control the plurality of the base station apparatuses 100-1 to 100-7.

The radio network controllers (RNCs) 101-1 to 101-3 holds various parameters indicating a relation of adjacent base station apparatuses (NodeB) 100-1 to 100-7, a radio wave output from each of the base station apparatuses (NodeB) 100-1 to 100-7, and similar. The task of setting these parameters is performed by a human.

On the other hand, there is a LTE (Long Term Evolution) systems as a next-generation telephone services (see, for example, the following Non-Patent Document 2 to Non-Patent Document 4). FIG. 13 illustrates an example of network configuration of the LTE system. A radio access network (RAN) of the LTE system includes base station apparatuses (eNodeB) 120-1 to 120-7. The base station apparatuses (eNodeB) are connected together via an S1/X2 flex network 121.

In the LTE system, handover can be performed more rapidly in comparison with the 3G cellular network system, for example, because the radio network controllers (RNCs) 101-1 to 101-3 are not connected in the LTE system.

Further, in the following Patent-Document 1 and Patent-Document 2, a mobile communication system is disclosed in which tracking to a newly installed base station apparatus can be set automatically.

[Non-Patent document 1] 3GPP TS23.002
[Non-Patent document 2] 3GPP TS23.401
[Non-Patent document 3] 3GPP TS23.402
[Non-Patent document 4] 3GPP TS36.300
[Patent document 1] Japanese Laid-Open Patent Publication No. 2008-193364
[Patent document 2] Japanese Laid-Open Patent Publication No. 2008-193366

In the LTE system, there is no the radio network controller (RNC), and so various parameters indicating the relation of the adjacent base station and similar are set in the base station apparatus (eNodeB). However, if the setting to various parameters is performed by the human in all the base station apparatuses (eNodeB), it may be worth an enormous amount of time and effort to a carrier, and cost is increased.

Further, if setup of a signal link, cancellation, and similar are performed manually in order to establish the signal link between the base station apparatuses (eNodeB) in the LTE system, it may be worth the enormous amount of time and effort to the carrier, and cost is increased.

SUMMARY

According to an aspect of the invention, a radio communication system, including: a first base station apparatus; a second base station apparatus; and a terminal apparatus, wherein radio communication is performed between the first and second base station apparatuses and the terminal apparatus, the first base station apparatus includes: a first position information acquisition unit which acquires position information of the first base station apparatus; a first control unit which generates a new-installation massage including the position information and indicating that the first base station apparatus is a newly installed base station apparatus and transmits the message to the second base station apparatus, transmits a signal link establishment request message to each second base station apparatus in the number capable of transmitting to the terminal apparatus as adjacent cell information when the first base station apparatus receives a new-installation response message responding to the new-installation message from the second base station apparatus, generates the adjacent cell information indicating that the second base station apparatus transmitted a signal link establishment response message is an adjacent base station apparatus when the first base station apparatus receives the signal link establishment response message responding to the signal link establishment request message from the second base station, and transmits to the second base station apparatus a removal request message to remove communication link with the second bas station apparatus not used in handover and deletes, from the adjacent cell information, information relating the second base station apparatus which is transmission destination of the removal request message when the handover is not performed within a fixed interval; and a transmission unit which transmits the adjacent cell information to the terminal apparatus, and wherein the terminal apparatus includes a reception unit which receives the adjacent cell information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of an adjacent cell list;

FIG. 8A illustrates an example of a cell shape and radio wave attainment distance, FIG. 8B illustrates an example of the relations of cell shapes between base stations;

FIG. 9 illustrates an example of an output list;

DESCRIPTION OF EMBODIMENTS

A First Embodiment

Figure 1:
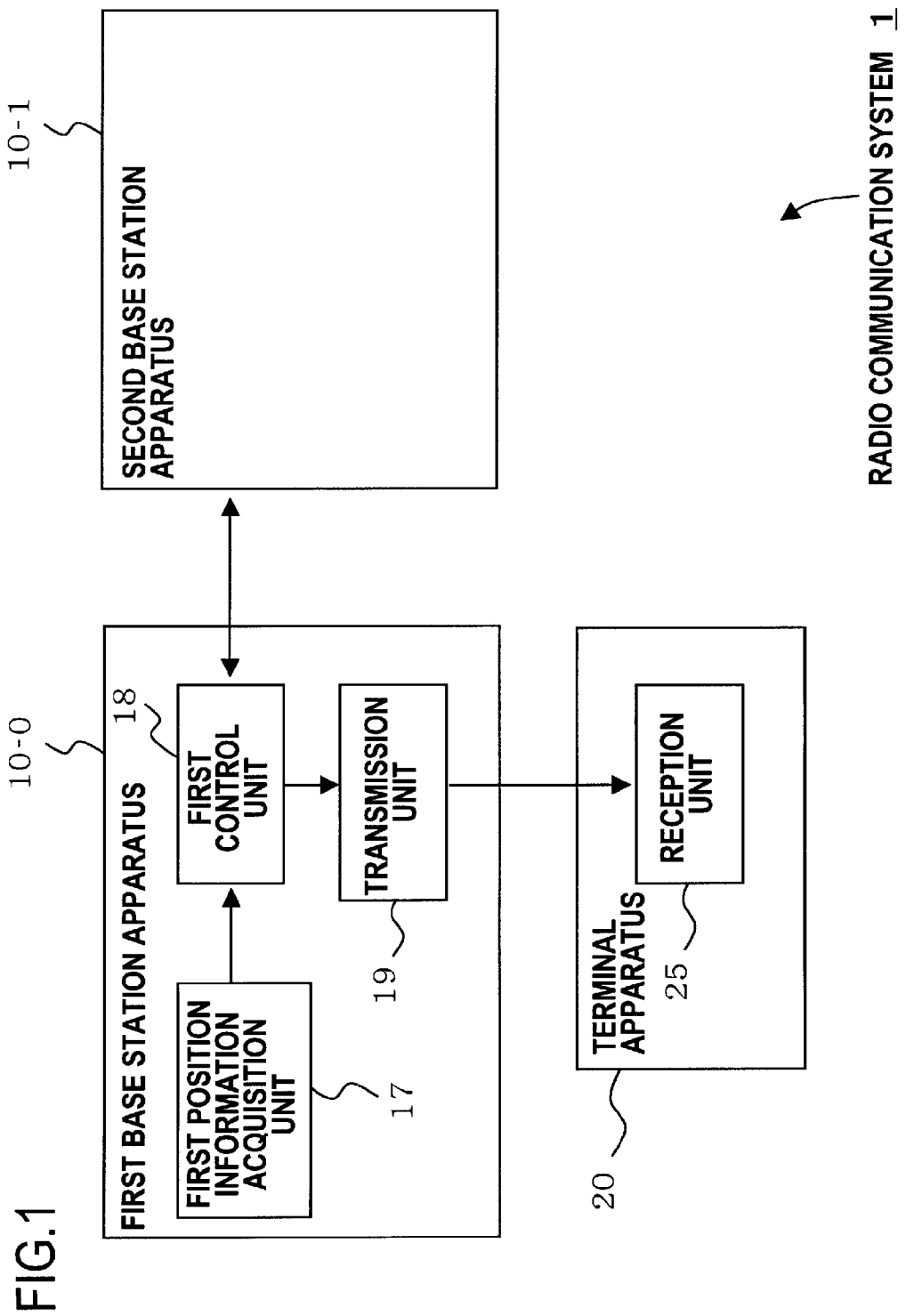
FIG. 1 illustrates an example of the configuration of a radio communication system.

A first embodiment is explained. FIG. 1 illustrates an example of the configuration of a radio communication system 1. In the radio communication system 1 for performing radio communication with a first and second apparatuses 10-0, 10-1 and a terminal apparatus 20, the first base station apparatus 10-1 includes: a first position information acquisition unit 17 which acquires position information of the first base station apparatus 10-1; a first control unit 18 which generates a new-installation massage including the position information and indicating that the first base station apparatus 10-0 is a newly installed base station apparatus and transmits the message to the second base station apparatus 10-1, transmits a signal link establishment request message to each the second base station apparatus 10-1 in the number capable of transmitting to the terminal apparatus 20 as adjacent cell information when the first base station apparatus 10-0 receives a new-installation response message responding to the new-installation message from the second base station apparatus 10-1, generates the adjacent cell information indicating that the second base station apparatus 10-1 transmitted a signal link establishment response message is an adjacent base station apparatus when the first base station apparatus 10-0 receives the signal link establishment response message responding to the signal link establishment request message from the second base station apparatus 10-1, and transmits to the second base station apparatus 10-1 a removal request message to remove communication link with the second bas station apparatus 10-2 not used in handover and deletes, from the adjacent cell information, information relating the second base station apparatus 10-1 which is transmission destination of the removal request message when the handover is not performed within a fixed interval; and a transmission unit 19 which transmits the adjacent cell information to the terminal apparatus 20, and wherein the terminal apparatus 20 includes a reception unit 25 which receives the adjacent cell information.

The first position information acquisition unit 17 acquires the position information for the first base station apparatus 10-0.

The first control unit 18 generates the new-installation message including the position information and indicating that the first base station apparatus 10-0 is the newly installed base station apparatus, and transmits the message to the second base station apparatus 10-1. The first control unit 18 transmits the signal link establishment request message to each the second base station apparatuses 10-1 in the number capable of transmitting to the terminal apparatus 20 as the adjacent cell information, when receiving from the second base station apparatus 10-1 the new-installation response message responding to the new-installation message. And, the first control unit 18 generates the adjacent cell information indicating that the second base station apparatus 10-1 transmitted the signal link establishment response message is the adjacent base station apparatus, when receiving from the second base station apparatus 10-1 the signal link establishment response message responding to the signal link establishment request message. Also, the first control unit 18 transmits to the second base station apparatus 10-1 the removal request message to remove the communication link with the second base station apparatus 10-1 not used in handover, and deletes, from the adjacent cell information, information relating the second base station apparatus 10-1 which is transmission destination of the removal request message when the handover is not performed within a fixed interval.

The transmission unit 19 transmits the adjacent cell information generated by the first control unit 18 to the terminal apparatus 20.

The reception unit 25 of the terminal apparatus 20 receives the adjacent cell information.

The first base station apparatus automatically establishes a signal link with the second base station apparatus 10-1 through the transmission and reception of the signal link establishment request message and the signal link establishment response message. Also, the first base station apparatus 10-0 transmits the removal request message to the second base station apparatus 10-1 for which handover is not executed within the fixed interval, and removes the signal link, so that the signal link is automatically removed. Hence, in the radio communication system 1, link setting and removal are performed automatically, so that compared with cases in which setting is performed manually, costs can be reduced.

A Second Embodiment

Figure 2:
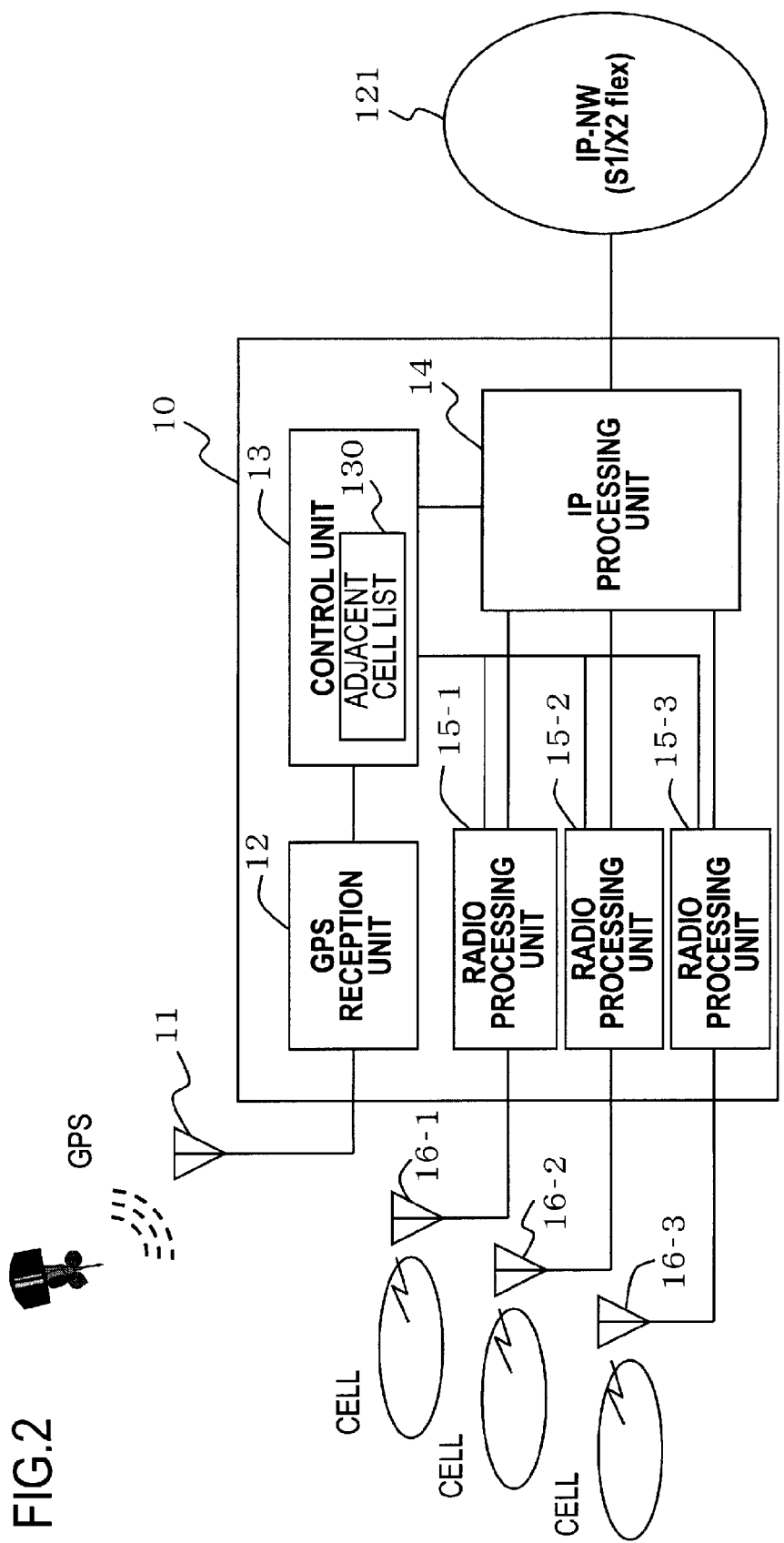
FIG. 2 illustrates an example of the configuration of a base station apparatus.
Figure 3:
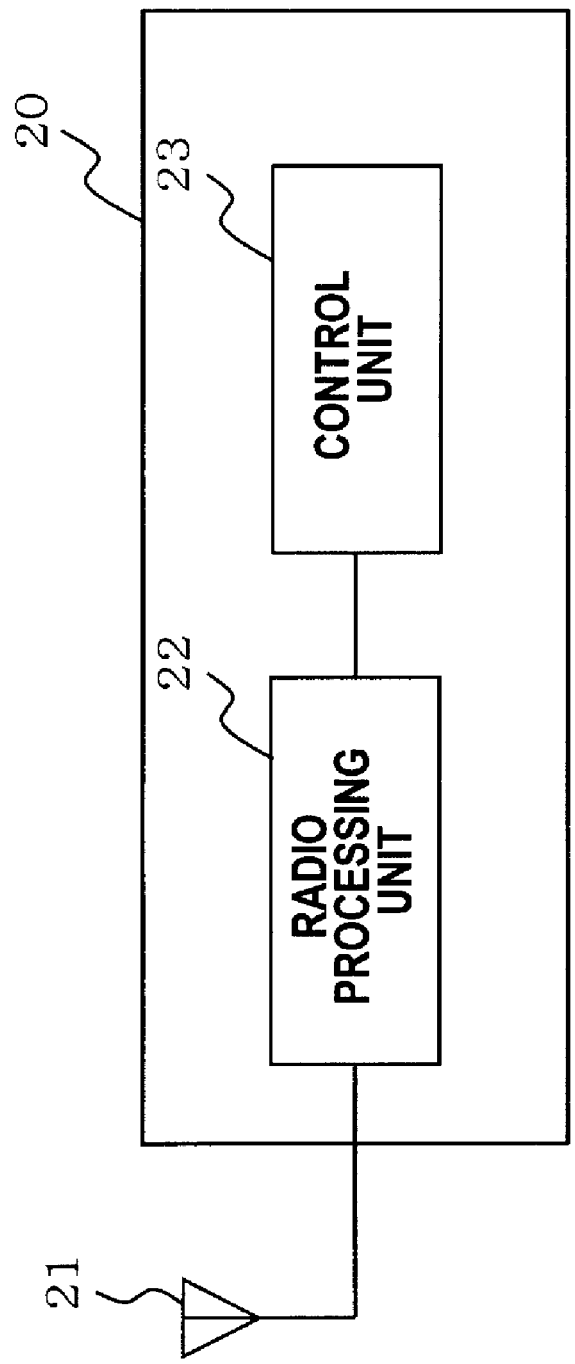
FIG. 3 illustrates an example of the configuration of a terminal apparatus.

Next, the second embodiment is explained. FIG. 2 illustrates an example of the configuration of the base station apparatus 10 in the radio communication system 1, and FIG. 3 illustrates an example of the configuration of the terminal apparatus 20.

The base station apparatus 10 includes an antenna 11, GPS reception unit 12, control unit 13, IP processing unit 14, radio processing units 15-1 to 15-3, and antennas 16-1 to 16-3.

The first position information acquisition unit 17 in the first embodiment corresponds for example to the antenna 11 and GPS reception unit 12, the first control unit 18 corresponds for example to the control unit 13 and IP processing unit 14, and the transmission unit 19 corresponds for example to the radio processing units 15-1 to 15-3 and antennas 16-1 to 16-3.

The antenna 11 receives GPS signal transmitted from satellite or similar.

The GPS reception unit 12 receives the GPS signal output from the antenna 11 and outputs the signal to the control unit 13.

The control unit 13 performs various control of units of the base station apparatus 10. For example, the control unit 13 computes the position of the base station apparatus itself based on the GPS signal, and generates various message and report information (or adjacent cell information). The control unit 13 includes an adjacent cell list 130, and holds identification information (eNB-ID) for adjacent base station apparatus and similar. Details of the control unit 13 and adjacent cell list 130 are described below.

The IP processing unit 14 is connected to other base station apparatus via an S1/X2 flex network (hereafter called an "IP network") 121, and serves as an interface with the IP network 121. The IP processing unit 14 transmits various message generated by the control unit 13 to other base station apparatuses via the IP network 121, and receives and outputs to the control unit 13 and similar the various message transmitted from other base station apparatus via the IP network 121. Detail is described below.

The radio processing units 15-1 to 15-3 encode report information and similar output from the control unit 13, perform modulation and other processing for conversion into radio signal, and output the result to each of the antennas 16-1 to 16-3. The radio processing units 15-1 to 15-3 also perform demodulation, decoding, and other processing of radio signal received by each of the antennas 16-1 to 16-3, and output the result to the control unit 13 or to the IP processing unit 14.

The antennas 16-1 to 16-3 transmit and receive radio signal with terminal apparatus 20 in each cell ranges.

The terminal apparatus 20 includes an antenna 21, radio processing unit 22, and control unit 23. The reception unit 25 of the terminal apparatus 2 in the first embodiment corresponds for example to the antenna 21, radio processing unit 22, and control unit 23.

The antenna 21 transmits and receives radio signal with the base station apparatus 10.

The radio processing unit 22 performs demodulation, decoding, and other processing of radio signal received by the antenna 21, outputs the result to the control unit 23, performs encoding, modulation, and other processing of signal, data and similar output from the control unit 23, and outputs the result as radio signal to the antenna 21.

The control unit 23 executes various control in the terminal apparatus 20. For example, the control unit 23 generates a handover request signal when the reception power or similar of the connected base station apparatus 10 falls below a threshold value, and similar.

Figure 4:
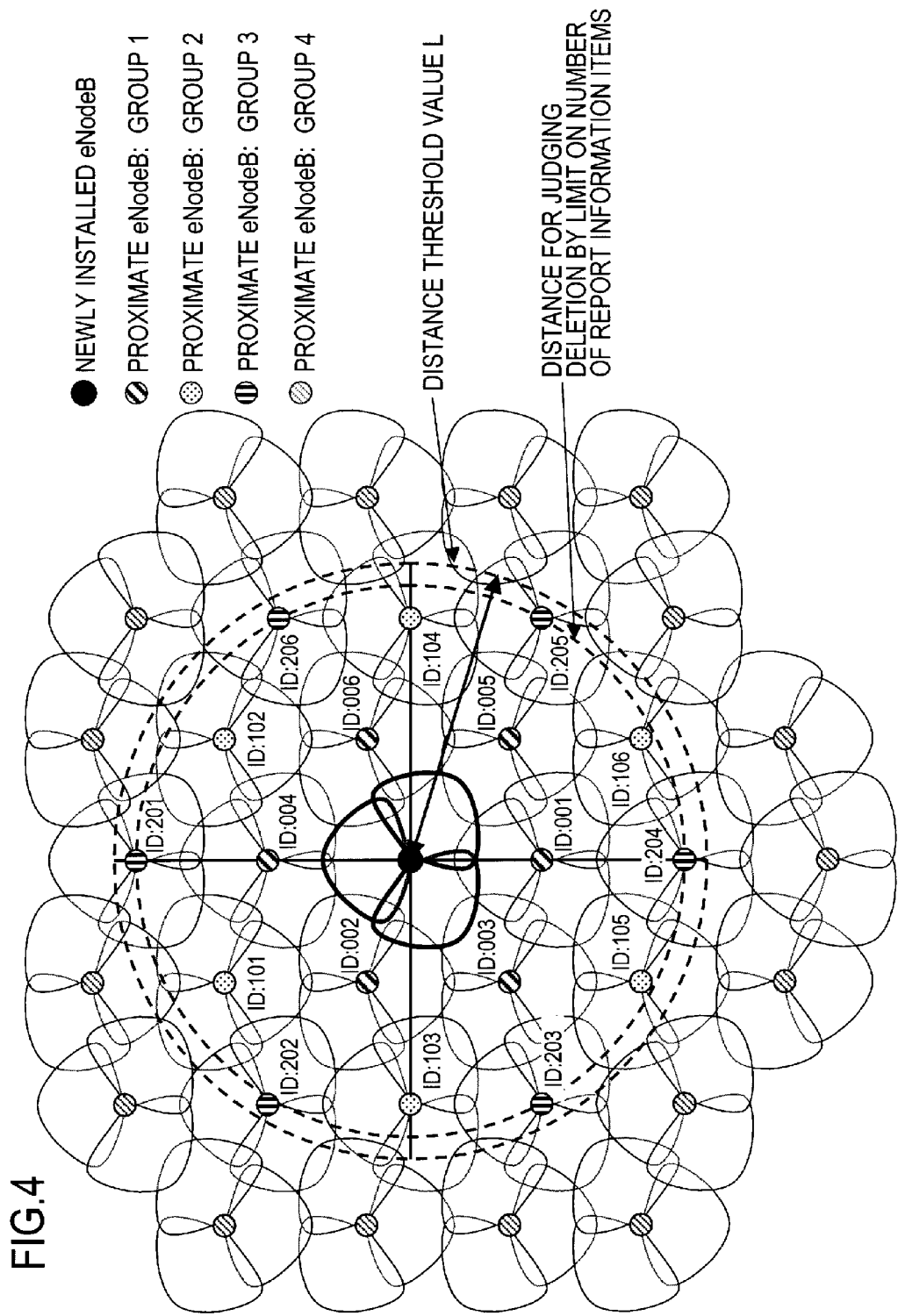
FIG. 4 illustrates an example of cell areas.

FIG. 4 illustrates an example of service area of base station apparatuses 10. In FIG. 4, the base station apparatus 10 in the center is the newly installed base station apparatus 10-0, and in order of proximity from the newly installed base station apparatus 10-0 are placed the proximate base station apparatuses 10-1 to 10-6 of group 1; the proximate base station apparatuses 10-101 to 10-106 of group 2; the proximate base station apparatuses 10-201 to 10-206 of group 3; and the proximate base station apparatuses 10-301 to 10-317 of group 4. In the second embodiment, each base station apparatus 10 has three sectors, and performs radio communication with terminal apparatuses 20 from the antennas 16-1 to 16-3 in each of the cell (sector) ranges. The proximate base station apparatuses 10-1 to 10-317 are preinstalled base station apparatuses which is installed prior to installation of the newly installed base station apparatus 10-0.

Figure 5:
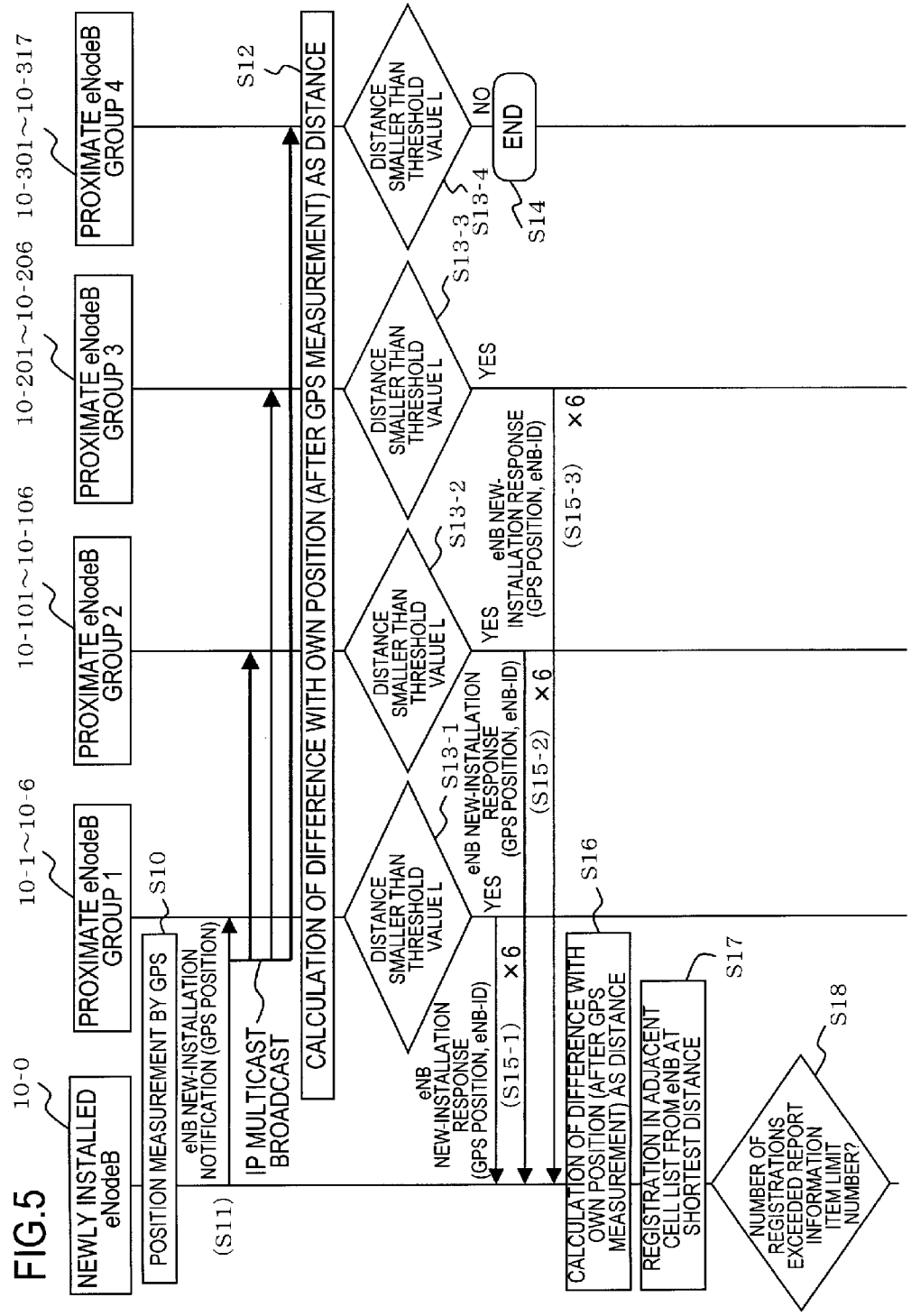
FIG. 5 is a sequence diagram illustrating an example of operation.
Figure 6:
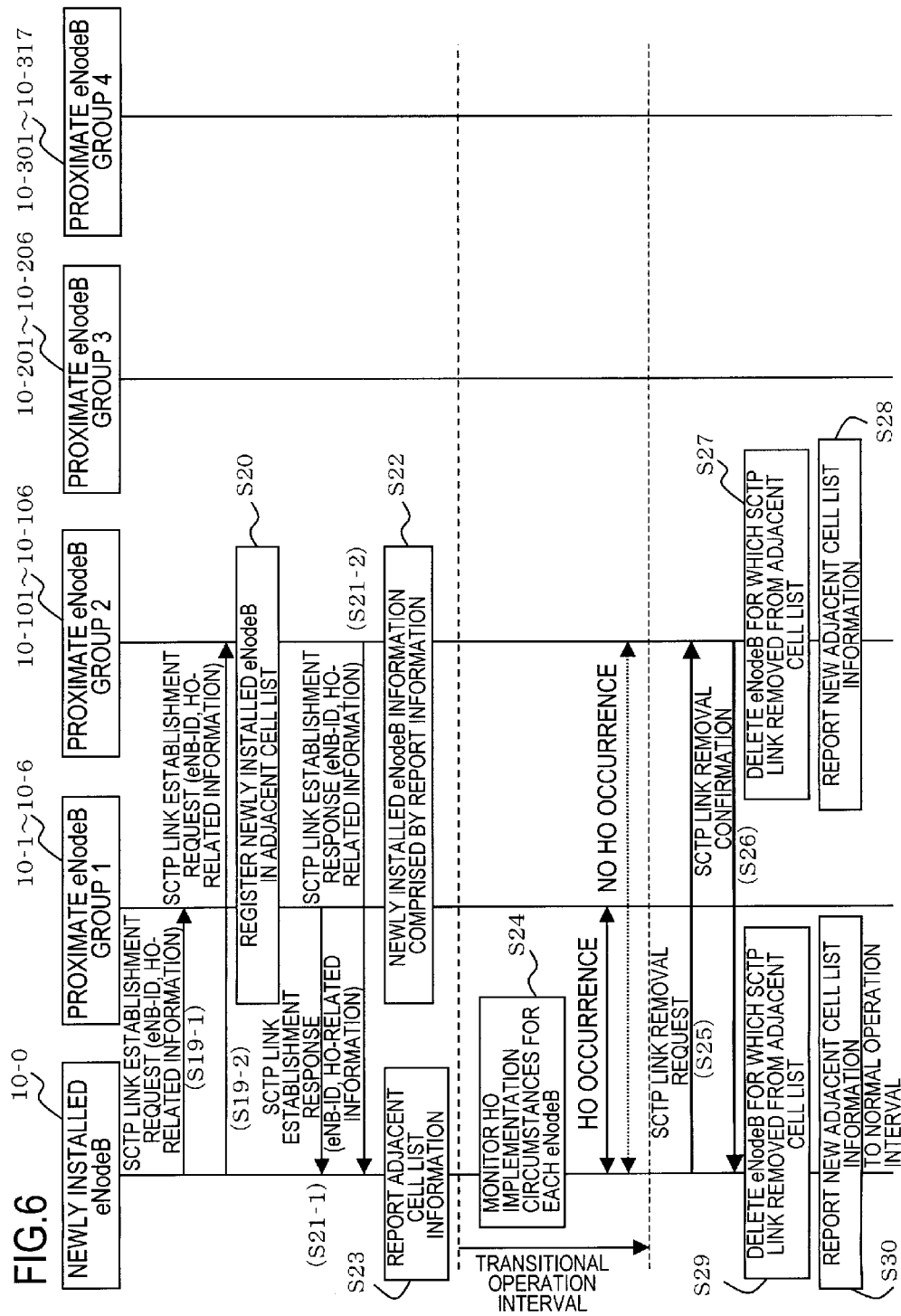
FIG. 6 is a sequence diagram illustrating an example of operation.

Next, an operation is explained. FIG. 5 and FIG. 6 are sequence diagrams illustrating an example of the operation.

First, the newly installed base station apparatus 10-0 uses GPS to measure the position of the apparatus itself (S10). The control unit 13 can acquire detailed position information such as for example latitude and longitude or similar, based on the GPS signal from the GPS reception unit 12.

Next, the newly installed base station apparatus 10-0 transmits by multicast eNB new-installation notification message to the proximate base station apparatuses 10-1 to 10-317 (S11). For example, the control unit 13, after acquiring position information, generates the eNB new-installation notification message indicating that the station itself is the newly installed base station apparatus, and outputs the message to the IP processing unit 14. At this time, the control unit 13 incorporates the acquired position information of the station itself in the message. The IP processing unit 14 transmits the message to the proximate base station apparatuses 10-1 to 10-317 via the IP network 121. The control unit 13 may transmit by multicast the eNB new-installation notification message to all preinstalled base station apparatuses connected to the newly installed base station apparatus 10-0.

Next, each of the proximate base station apparatuses 10-1 to 10-317 calculates the distance between the two base station apparatuses, based on the position of the station apparatus itself already measured and the position information for the newly installed base station apparatus 10-0 included in the eNB new-installation notification message (S12). For example, the control unit 13 of each proximate base station apparatus 10-1 to 10-317 extracts the position information for the newly installed base station apparatus 10-0 from the eNB new-installation notification message input to the IP processing unit 14. And, the control unit 13 calculates the distance by calculating the difference between the position of the station apparatus itself measured using the GPS reception unit 12 and similar, and the position of the extracted new installation base station apparatus 10-0.

Next, each of the proximate base station apparatuses 10-1 to 10-317 is judged to be a candidate base station apparatus adjacent to the newly installed base station apparatus 10-0 (Yes in S13-1 to S13-3), if the calculated distance is smaller than a threshold value L (or is smaller than or equal to the threshold value L), On the other hand, each of the proximate base station apparatuses 10-1 to 10-317 is judged not to be the candidate base station adjacent to the newly installed base station apparatus 10-0 (No in S13-4), if the calculated distance is equal to or greater than the threshold value L (or is greater than the threshold value L), and the series of processing ends In the example of FIG. 5, the proximate base station apparatuses 10-1 to 10-206 of groups 1 to 3 are judged to be the candidate adjacent base station apparatus, and the proximate base station apparatuses 10-301 to 10-317 of group 4 are judged not to be the candidate adjacent base station apparatus. These judgments are for example performed by the control unit 13.

The proximate base station apparatuses 10-1 to 10-206 judged to be the candidate adjacent base station apparatus respond to the newly installed base station apparatus 10-0 with an eNB new-installation response message (S15-1 to S15-3). The eNB new-installation response message is a message responding to the eNB new-installation notification message, and includes the position information for each of the proximate base station apparatuses 10-1 to 10-206 themselves, and identification information (eNB-ID) unique to each of the proximate base station apparatuses 10-1 to 10-206. For example, the control unit 13 of the proximate base station apparatuses 10-1 to 10-206 generates the eNB new-installation response message so as to include the held its own position information and the held identification information, upon judgment that the station apparatus itself is the candidate adjacent base station. And, the IP processing unit 14 transmits the response message to the newly installed base station apparatus 10-0.

The newly installed base station apparatus 10-0 calculates the difference with its own position, and calculates the distance between the base station apparatuses, upon receiving an eNB new-installation response message (S16). For example, the control unit 13 of the newly installed base station apparatus 10-0 calculates the difference between the positions of each of the proximate base station apparatuses 10-1 to 10-206 included in the eNB new-installation response message and the position measured in S10, in the order of reception of the eNB new-installation response message.

Next, the newly installed base station apparatus 10-0 registers the identification information, distance, and similar of the proximate base station apparatuses 10-1 to 10-206 in an adjacent cell list 130, in the order of the proximate base station apparatuses 10-1 to 10-206 closest to the newly installed base station apparatus 10-0 (S17).

The number of proximate base station apparatuses 10-1 to 10-206 which can be registered in the adjacent cell list 130 is determined by the number of information items for adjacent base station notification of which can be given in report information transmitted to the terminal apparatus 20 from the newly installed base station apparatus 10-0. For example, if the maximum number of adjacent base stations for which the notification can be given in the report information is "12", then the number of proximate base station apparatuses 10-1 to 10-206 which can be registered in the adjacent cell list 130 is "12". Registration in the adjacent cell list 130 is for example performed by the control unit 13. Registration in the adjacent cell list 130 at the time of S17 is for example tentative registration as the adjacent base station apparatus.

FIG. 7 illustrates an example of the adjacent cell list 130 in the newly installed base station apparatus 10-0. The adjacent cell list 130 includes, for each base station apparatus 10-1 to 10-317, the identification information (eNB-ID), the distance, and handover-related information (hereafter "HO-related information") indicating information which is necessary for handovers. The HO-related information includes the identification information for each cell (cell ID) and the report frequency when transmitting the report information and similar from each cell (or each antenna 16-1 to 16-3). The report information includes for example the information registered in the adjacent cell list 130.

Next, the newly installed base station apparatus 10-0 judges whether the number of registrations exceeds the report information limit number (S18). For example, the control unit 13 judges whether the number of registrations in the adjacent cell list 130 exceeds "12". In the example illustrated in FIG. 7, the proximate base station apparatuses 10-201 to 10-206 are at a greater distance from the newly installed base station apparatus 10-0 compared with other proximate base station apparatus. The registration in the adjacent cell list 130 of the proximate base station apparatuses 10-201 to 10-206 exceed the registration number "12". In this case, the proximate base station apparatuses 10-201 to 10-206 are not registered in the adjacent cell list 130.

Next, the newly installed base station apparatus 10-0 transmits a SCTP (Stream Control Transmission Protocol) link establishment request message to the proximate base station apparatuses 10-1 to 10-106 registered in the adjacent cell list 130 (S19-1, S19-2).

In the example of FIG. 5, the newly installed base station apparatus 10-0 transmits the SCTP link establishment request message to the proximate base station apparatuses 10-301 to 10-317 of groups 1 and 2. The SCTP link establishment request message includes the identification information (eNB-ID) for the newly installed base station apparatus 10-0 and the HO-related information.

For example, the control unit 13 of the newly installed base station apparatus 10-0 generates the SCTP link establishment request message so as to include its own identification information and the HO-related information, and notifies such as the IP processing unit 14 transmitting the message to the proximate base station apparatuses 10-1 to 10-106 registered in the adjacent cell list 130. The IP processing unit 14 transmits the SCTP link establishment request message to the proximate base station apparatuses 10-1 to 10-206. Through transmission of the SCTP link establishment request message by the newly installed base station apparatus 10-0, operation to establish communication links with the proximate base station apparatuses 10-1 to 10-106 is performed.

Next, each of the proximate base station apparatuses 10-1 to 10-106 which is received the SCTP link establishment request message registers information relating to the newly installed base station apparatus 10-0 in its own adjacent cell list 130 (S20). For example, the control unit 13 of the proximate base station apparatuses 10-1 to 10-106 register the identification information (eNB-ID), the HO-related information, and similar for the newly installed base station apparatus 10-0 in the adjacent cell list 130.

Next, each of the proximate base station apparatuses 10-1 to 10-106 transmits a SCTP link establishment response message to the newly installed base station apparatus 10-0 (S21-1, S21-2). The SCTP link establishment response message includes the identification information (eNB-ID) and the HO-related information for the proximate base station apparatus 10-1 to 10-106 itself. For example, the control unit 13 of the proximate base station apparatus 10-1 to 10-106 reads the identification information and HO-related information stored for itself, and generates the message such that this information is included in the SCTP link establishment response message. And, the message is transmitted from the IP processing unit 14 to the newly installed base station apparatus 10-0.

Next, the proximate base station apparatuses 10-1 to 10-106 notify the report information including the information relating to the adjacent base station apparatuses within the cells of the proximate base station apparatuses 10-1 to 10-106 (S22). This report information also includes the information relating to the newly installed base station apparatus 10-0 as the proximate base station apparatus. For example, the control unit 13 of the proximate base station apparatus 10-1 to 10-106 generates the report information which takes the base station apparatuses registered in the adjacent cell list 130 to be adjacent base station apparatus, and reports to the terminal apparatus 20 via the radio processing units 15-1 to 15-3.

On the other hand, the newly installed base station apparatus 10-0 registers the HO-related information for the proximate base station apparatuses 10-1 to 10-106 included in the SCTP link establishment response message in the adjacent cell list 130, upon receiving the SCTP link establishment response message. And, the newly installed base station apparatus 10-0 reports the report information indicating that the proximate base station apparatuses 10-1 to 10-106 registered in the adjacent cell list 130 is the adjacent base station apparatus (S23). For example, the control unit 13 of the newly installed base station apparatus 10-0 generates the report information indicating that the base station apparatuses registered in the adjacent cell list 130 is the adjacent base station apparatus, and reports to the terminal apparatus 20 via the radio processing units 15-1 to 15-3.

The newly installed base station apparatus 10-0 and the proximate base station apparatuses 10-1 to 10-106 all report the report information, and handover transitional operation is begun. In the example of FIG. 5, from the time of the processing of S22 and S23, the transitional operation interval is begun. At this time, a total of 12 SCTP links are established between the newly installed base station apparatus 10-0 and the proximate base station apparatuses 10-1 to 10-106 of groups 1 and 2.

When the transitional operation interval is begun, the newly installed base station apparatus 10-0 monitors the handover implementation circumstances for each proximate base station apparatus 10-1 to 10-206 (S24). This is in order that the newly installed base station apparatus 10-0 can delete proximate base station apparatuses 10-1 to 10-206 not performing handover from the adjacent cell list 130, and can request the SCTP link removal. Or, this is in order that the newly installed base station apparatus 10-0 can formally register the proximate base station apparatus 10-1 to 10-206 performing handover in the adjacent cell list 130 as the adjacent base station.

The monitoring (S24), for example, is performed such that, the newly installed base station apparatus 10-0 excludes the base station apparatus 10-1 to 10-206 from the removal if the newly installed base station apparatus 10-0 performs handover during transitional interval (or when the SCTP link is used), and becomes an object for the removal if not performs handover even once.

The control unit 13 of the newly installed base station apparatus 10-0 receives a handover request signal from the terminal apparatus 20 if for example the newly installed base station apparatus 10-0 is the connection source, and the connection target base station apparatus is the proximate base station apparatus 10-1 to 10-106 in handover. This request signal includes the information indicating that the connection target is the proximate base station apparatus 10-1 to 10-106, and is notified to the control unit 13 via the radio processing units 15-1 to 15-3. And, the control unit 13 transmits a handover request message to the connection target proximate base station apparatuses 10-1 to 10-106. The control unit 13 can judge whether hand over is performed or not according to whether the control unit transmits the message to the connection target proximate base station apparatuses 10-1 to 10-106 during the transitional interval. Or, when the proximate base station apparatus 10-1 to 10-106 is the connection source base station apparatus and the newly installed base station apparatus 10-0 is the connection target base station apparatus, the proximate base station apparatuses 10-1 to 10-106 receive the handover request signal from the terminal apparatus 20, and transmits the handover request message to the newly installed base station apparatus 10-0. The control unit 13 of the newly installed base station apparatus 10-0 receives the message via the IP processing unit 14. The control unit 13 can judge whether handover is performed according to whether the message is received.

As another example of monitoring, the newly installed base station apparatus 10-0 counts the number of uses for each SCTP link during the transitional interval, and the SCTP link at or below the fixed threshold value is made the object for removal. For example, when the newly installed base station apparatus 10-0 is the connection source base station apparatus, the control unit 13 of the newly installed base station apparatus 10-0 receives the handover request signal from the terminal apparatus 20 and transmits the handover request message to the connection target proximate base station apparatuses 10-1 to 10-106 via the IP processing unit 14. The control unit 13 counts the number of transmissions of the message for each connection target proximate base station apparatus 10-1 to 10-106, compares results with the threshold value, and judges the object for removal. Or, when the proximate base station apparatus 10-1 to 10-106 is the connection source, and the newly installed base station apparatus 10-0 is the connection target base station apparatus, the control unit 13 of the newly installed base station apparatus 10-0 judges the object for removal from the number of receptions of the handover request message received via the IP processing unit 14 from each of the proximate base station apparatuses 10-1 to 10-106.

Further, as another example of monitoring, the provisional interval is delimited into week units, month units, or similar, and the newly installed base station apparatus 10-0 counts the number of link usages in week units or similar, and when the number of link usages in the previous certain number of weeks or similar is "0", sets the link as the object for removal. For example, the control unit 13 of the newly installed base station apparatus 10-0 counts the number of transmissions of handover request messages, or counts the number of receptions of the message in each week or similar, and sets as the object for removal the SCTP link for which the number of usages in the previous certain number of weeks is "0". For example, by means of this monitoring, changes in the cell environment (the erection of a building or similar), or a change of what is the adjacent base station apparatus to no longer be adjacent, and other changes can be detected in the newly installed base station apparatus 10-0 or in proximate base station apparatuses 10-1 to 10-106.

Further, as another example of monitoring, when burst-like link usage occurs between the adjacent base station apparatuses, the link may be made an object of preferential preservation, and otherwise the link may be made the object for removal. For example, there may be such cases when there is a railroad line between adjacent base station apparatus, so that when a train carrying numerous passengers passes through, handover occurs simultaneously for a plurality of terminal apparatuses 20. By this means, for example, processing capacity can be allocated for links which occur in burst fashion. For example, the control unit 13 of the newly installed base station apparatus 10-0 counts, for each of the proximate base station apparatuses 10-1 to 10-106, the number of times the handover request signal is received from the terminal apparatus 20 and the handover request message is transmitted. Or, the control unit 13 counts the number of times the handover request message is received from each of the proximate base station apparatuses 10-1 to 10-106. And, when the count value is equal to or greater than the threshold value in a certain interval, the control unit 13 sets the link between the newly installed base station apparatus 10-0 and the certain proximate base station apparatus 10-1 to 10-106 as an object for preservation, and otherwise sets the link as the object for removal.

The newly installed base station apparatus 10-0 monitors the HO execution circumstance (S24), and if there is a link to be removed, transmits a SCTP link remove request message to the proximate base station apparatus 10-1 to 10-106 which is the link connection target (S25). In the example of FIG. 6, the handover does not occur in the transitional interval with the proximate base station apparatus 10-101 to 10-106 in group 2, and these are remove objects. In this case, the newly installed base station apparatus 10-0 transmits the SCTP link remove request message to all of the proximate base station apparatuses 10-101 to 10-106 of group 2. For example, when there are proximate base station apparatuses 10-1 to 10-106 which do not satisfy the above conditions during the transitional interval, the control unit 13 of the newly installed base station apparatus 10-0 generates the SCTP link removal request messages, and transmits the message to the proximate base station apparatuses 10-101 to 10-106 via the IP processing unit 14.

The proximate base station apparatus 10-101 to 10-106 which received the SCTP link removal request message transmits the SCTP link removal confirmation message to the newly installed base station apparatus 10-0 in response to the request message (S26).

Next, the proximate base station apparatus 10-101 to 10-106 which received the SCTP link removal request message deletes the adjacent cell information for the newly installed base station apparatus 10-0 from the adjacent cell list 130 (S27), and based on the updated adjacent cell list 130, reports the report information (S28). For example, the control unit 13 of the proximate base station apparatus 10-101 to 10-106, upon receiving the SCTP link removal request message, generates the SCTP link removal confirmation message, and transmits the message via the IP processing unit 14. And, the control unit 13 deletes the information for the newly installed base station apparatus 10-0 from the adjacent cell list 130, and based on the updated adjacent cell list 130, creates the report information which is reported to the terminal apparatus 20 via the radio processing units 15-1 to 15-3.

Upon receiving the SCTP link removal confirmation message, the newly installed base station apparatus 10-0 deletes the proximate base station apparatus 10-101 to 10-106 for which the SCTP link is removed from the adjacent cell list 130 (S29). And, the newly installed base station apparatus 10-0 reports the report information based on the updated adjacent cell list 130 (S30). For example, upon receiving the SCTP link removal confirmation message from the proximate base station apparatus 10-101 to 10-106, the control unit 13 of the newly installed base station apparatus 10-0 deletes the identification information and similar for the proximate base station apparatus 10-101 to 10-106 in question from the adjacent cell list 130. And, the control unit 13 generates the report information indicating that each of the proximate base station apparatuses 10-1 to 10-6 included in the updated adjacent cell list 130 is the adjacent base station apparatus, and reports the report information via the radio processing units 15-1 to 15-3.

Thereafter, the radio communication system 1 begins normal operation. The information relating to proximate base station apparatuses 10-1 to 10-6 as the adjacent base stations is registered in the adjacent cell list 130 of the newly installed base station apparatus 10-0. And, the information relating to the newly installed base station apparatus 10-0 as the adjacent base station apparatus is registered in the adjacent cell lists 130 of the proximate base station apparatuses 10-1 to 10-6.

In this way, in the second embodiment, the signal links are established between the newly installed base station apparatus and proximate base station apparatuses during the transitional interval, and the signal links are removed or not removed according to whether handover is actually executed. In the proximate base station apparatuses for which the signal links are removed and in the newly installed base station apparatus, the information is deleted from the adjacent cell lists 130, and after passage of the transitional interval, the information is registered in the adjacent cell lists 130 of the newly installed base station apparatus and the other proximate base station apparatuses, as the adjacent base stations. Hence, the radio communication system 1 can automatically set and remove communication links between the newly installed base station apparatus and adjacent base station apparatuses. Further, the radio communication system 1 performs the setting and removal automatically, costs can be reduced in comparison with a case in which setting and similar are performed manually. Also, the newly installed base station apparatus and the adjacent base station apparatus registers automatically the information relating to the adjacent base station, the costs can be reduced in comparison with a case in the registration is performed manually.

A Third Embodiment

Next, the third embodiment is explained. The third embodiment is an example in which the distance, as well as radio wave output, and compass direction relative to other base station apparatuses, are considered when judging an adjacency relation (S13-1 to S13-4, S16, and similar).

The base station apparatus 10 may have different radio wave outputs from the antennas 16-1 to 16-3, and different cell shapes, according to topography in which the base station apparatus 10 is located, the antennas 16-1 to 16-3, buildings in the vicinity, and similar. Hence, the radio wave attainment distance from the base station apparatus 10 to the terminal apparatus 20 changes with the compass directions of the antennas 16-1 to 16-3.

FIG. 8A illustrates an example of the relation between the cell shape and radio wave attainment distance. This FIG. 8A illustrates that, when the radio wave attainment distance in the direction of maximum output in a certain cell (or for the antenna 16-1 to 16-3) is D1, the radio wave attainment distance D2 in the direction at a certain compass direction from the direction of maximum output falls to 75%.

Also, FIG. 8B illustrates that there are cases in which, due to the cell shape, even when the distance between two base station apparatuses 10 is the same, adjacency is and is not possible. The third embodiment is an example in which adjacency relations are judged taking such cases into consideration.

Figure 10:
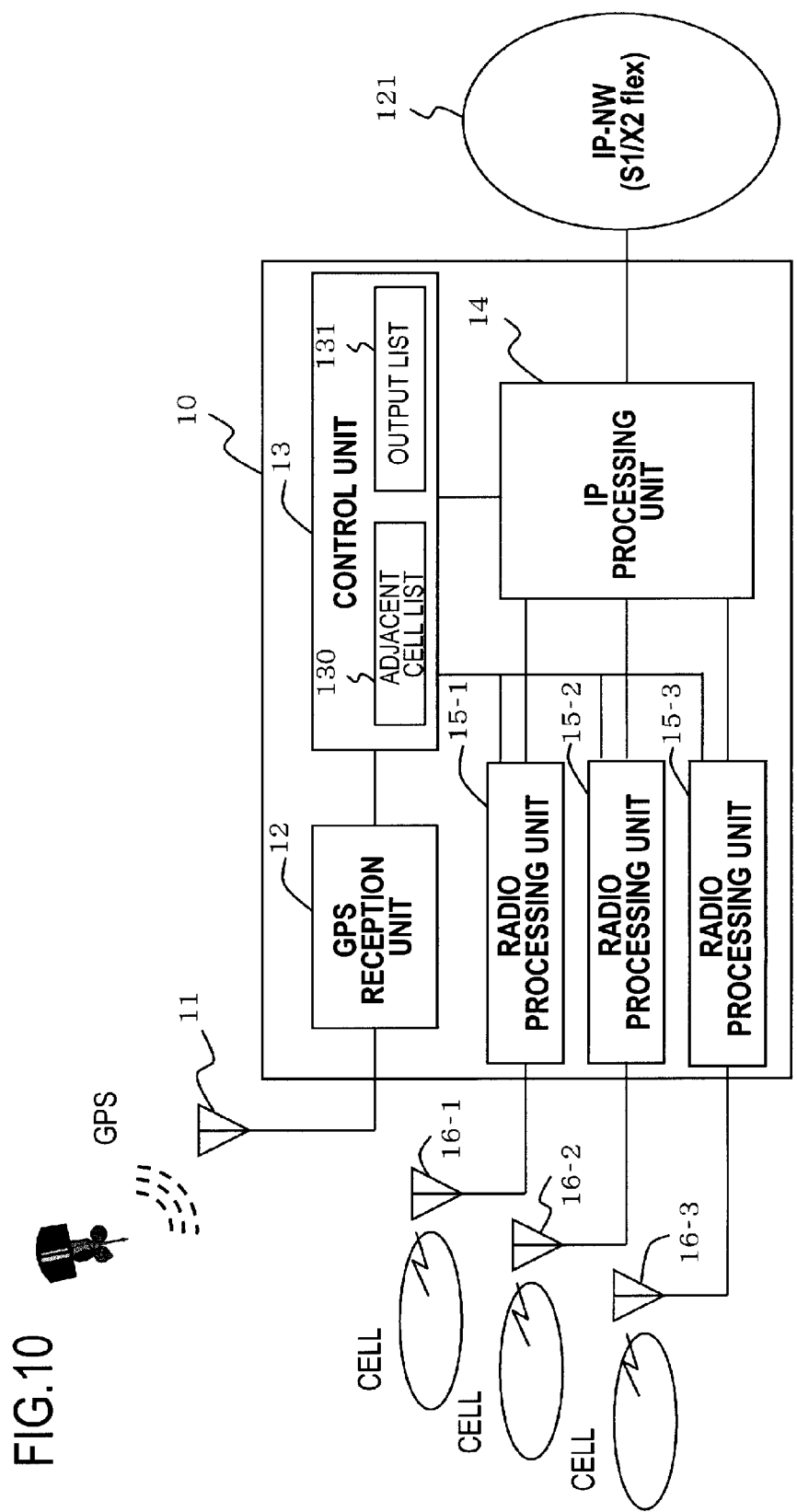
FIG. 10 illustrates another example of the configuration of a base station apparatus.

Existing proximate base station apparatuses 10-1 to 10-317 hold in advance data for the compass directions and outputs (hereafter called an "output list" 131) corresponding to the cell shapes of the radio waves output by the station itself. FIG. 9 illustrates an example of the output list 131, and FIG. 10 illustrates an example of the configuration of the base station apparatus 10. In FIG. 9, an example is illustrated for the three-cell base station apparatus 10 having maximum outputs in three directions, which are the compass directions "110°" (where 0° is north), "230°", and "350°". The output list 131 is for example held in the control unit 13, as illustrated in FIG. 10.

Figure 11:
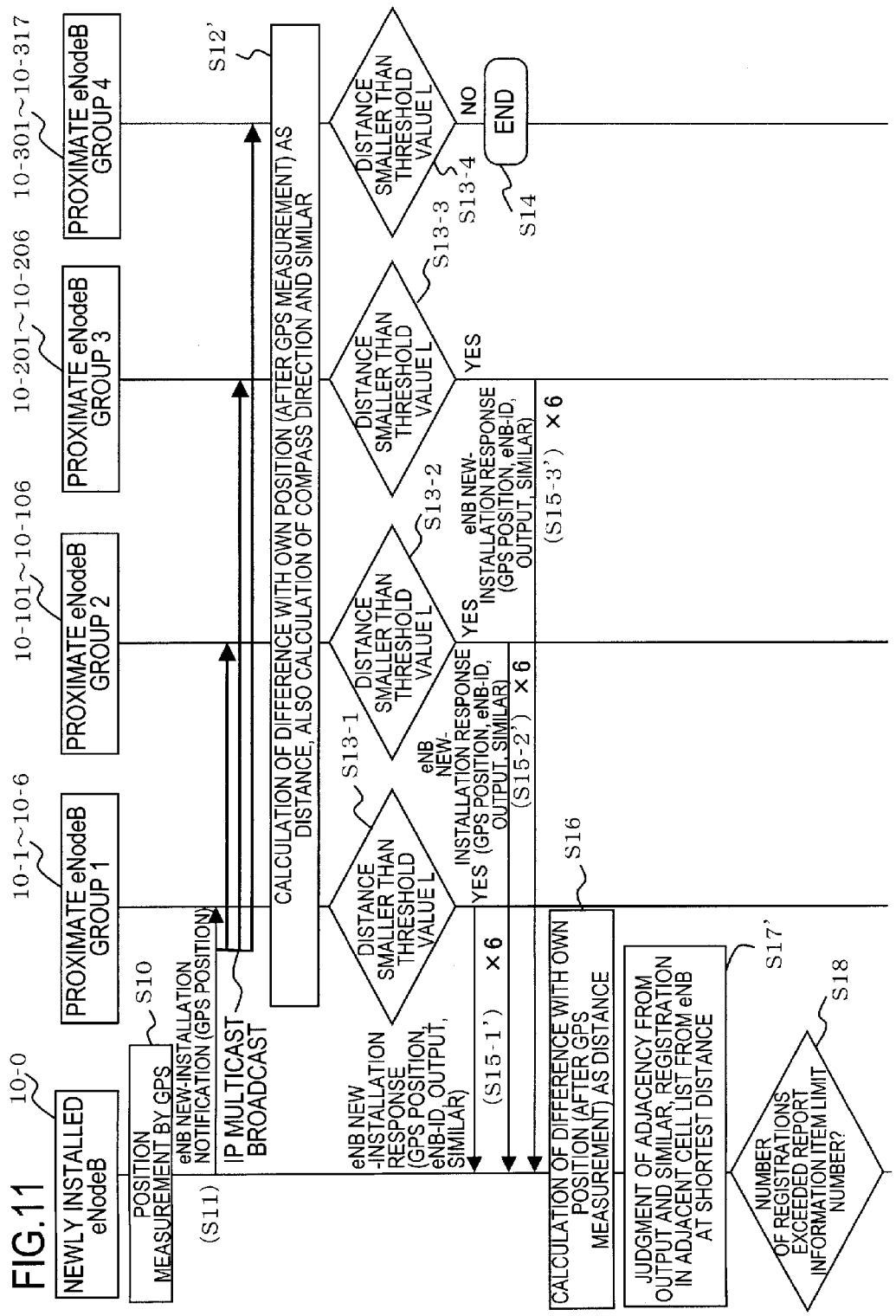
FIG. 11 is a sequence diagram illustrating an example of operation.
Figure 12:
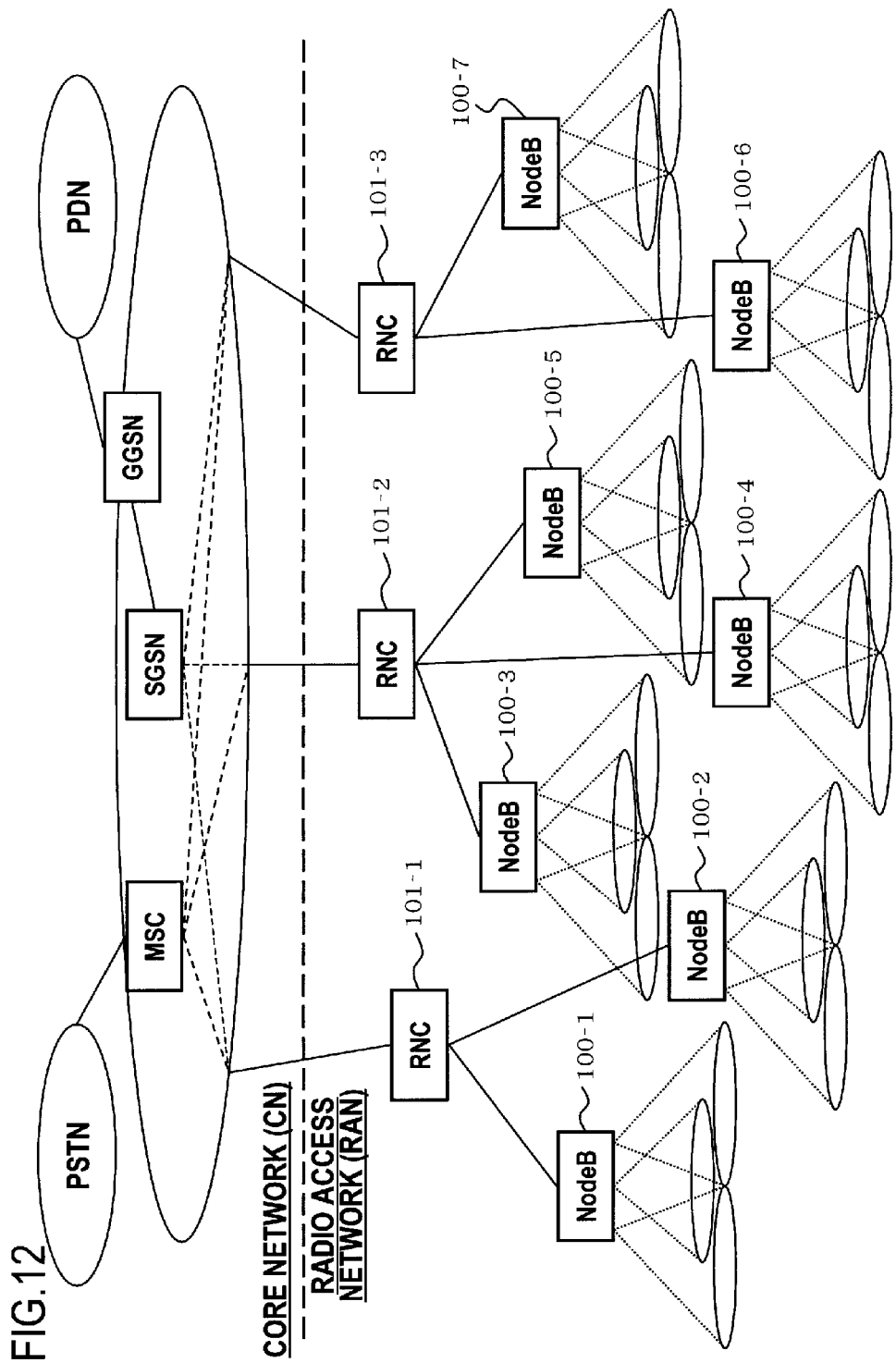
FIG. 12 illustrates an example of the network configuration of a 3G cellular system.
Figure 13:
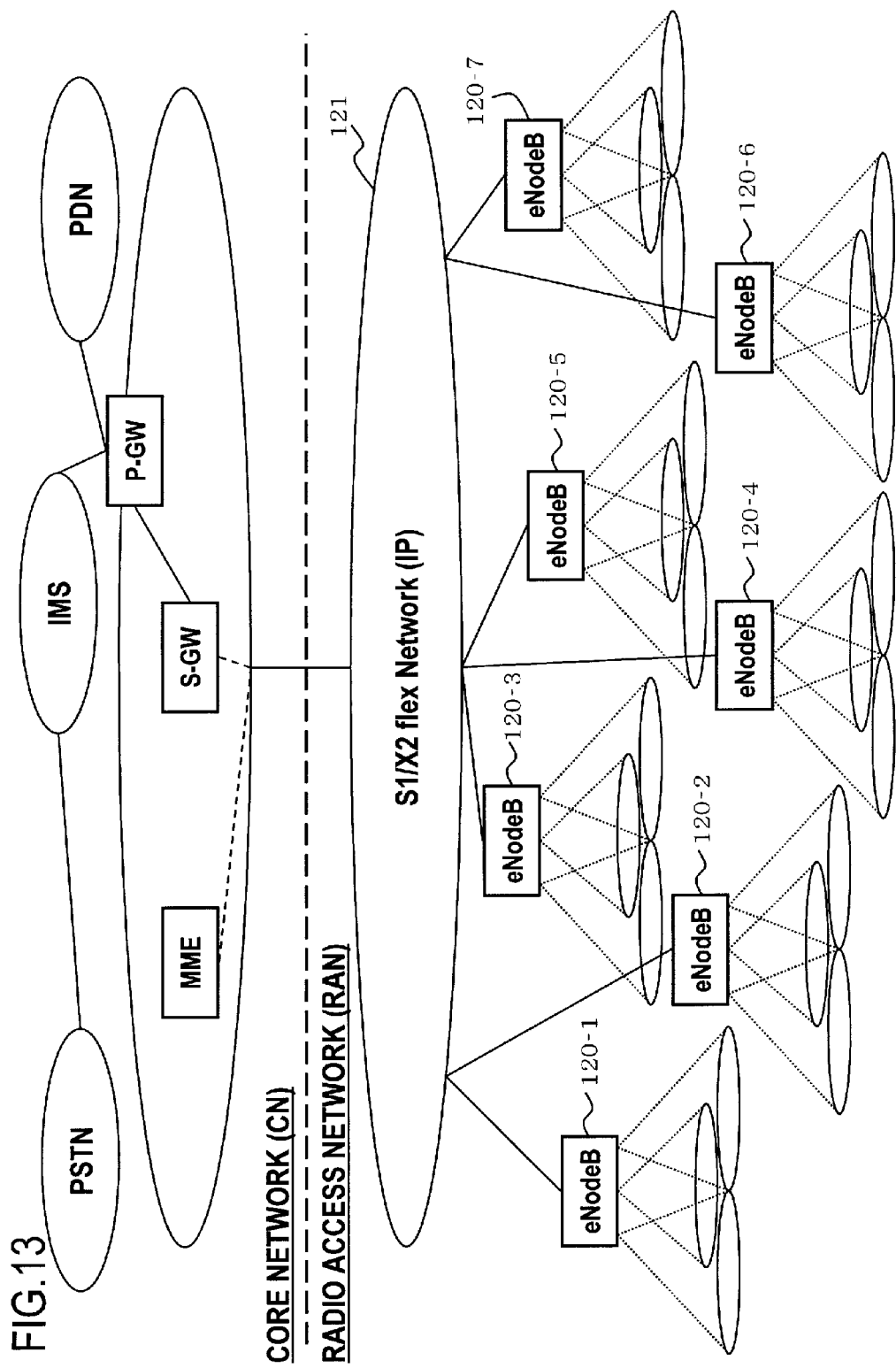
FIG. 13 illustrates an example of the network configuration of a LTE system.

Next, an operation is explained. FIG. 11 is a sequence diagram illustrating an example of the operation. Upon receiving the eNB new-installation notification message from the newly installed base station apparatus 10-0, the proximate base station apparatuses 10-1 to 10-317 calculate the distance, and also calculate the compass direction from GPS position information included in the message. And, the proximate base station apparatuses 10-1 to 10-317 further extract from the output list 131 the antenna output at that compass direction (S12'). For example, the control unit 13 of the proximate base station apparatus 10-1 to 10-317 calculates the compass direction of the newly installed base station apparatus 10-0 relative to the station apparatus itself from the GPS position information included in the message and from the GPS position information for the station itself, measured in advance. And, the control unit 13 extracts the antenna output corresponding to the compass direction from the output list 131. For example, when the compass direction of the newly installed base station apparatus 10-0 is "130°", the control unit 13 extracts the antenna output "90%" from the output list 131.

Next, the proximate base station apparatuses 10-1 to 10-206 compare the distance with a threshold value (S13-1 to 513-4), and transmit the eNB new-installation response message to the newly installed base station apparatus 10-0 (S15-1' to 15-3'). Here, the eNB new-installation response message includes the GPS position information for the station itself, the eNB-ID for the station itself, and in addition the antenna outputs, and radio wave output data (attainment distance at maximum output and similar; in the case of the base station apparatus 10 comprising a plurality of cells, maximum output attainment distances for each cell may be included). For example, the control unit 13 generates the eNB new-installation response message including these information, and transmits the message to the newly installed base station apparatus 10-0 via the IP processing unit 14.

Next, the newly installed base station apparatus 10-0 calculates the distances to the proximate base station apparatuses 10-1 to 10-206 (S16), and then computes radio wave attainment distances and similar from the proximate base station apparatuses 10-1 to 10-206 in the direction of the station itself, performs adjacency judgments, and performs registration in the adjacent cell list 130 (S17').

The following case is an example of the adjacency judgment. For example, suppose that the proximate base station apparatus 10-1 has a maximum-output attainment distance of "1 km" and the antenna output to the newly installed base station apparatus 10-0 of "90%", and that the proximate base station apparatus 10-2 has a maximum-output attainment distance of "1.3 km" and the antenna output to the newly installed base station apparatus 10-0 of "80%". These information are included in the eNB new-installation response messages, transmitted from each of the proximate base station apparatuses 10-1, 10-2. The distances from the proximate base station apparatuses 10-1, 10-2 to the newly installed base station apparatus 10-0 are assumed to be "1.8 km" and "1.9 km" respectively (S16).

And, the control unit 13 of the newly installed base station apparatus 10-0 computes actual attainment distances and performs the adjacency judgments. For example, suppose that the actual attainment distance is (maximum-output attainment distance)×(antenna output in output direction). The actual attainment distance of the proximate base station apparatus 10-1 toward the newly installed base station apparatus 10-0 is 1 km×90%=0.9 km. In this case, the newly installed base station apparatus 10-0 must cover the cell range of 1.8−0.9=0.9 km in order to be adjacent to the proximate base station apparatus 10-1.

On the other hand, the actual attainment distance of the proximate base station apparatus 10-2 toward the newly installed base station apparatus 10-0 is 1.3 km×80%=1.04 km. In this case, the newly installed base station apparatus 10-0 must cover the cell range of 1.9−1.04=0.86 km in order to be adjacent to the proximate base station apparatus 10-2.

In these examples, the distances from the newly installed base station apparatus 10-0 to the proximate base station apparatus 10-2 is shorter than the distance to the proximate base station apparatus 10-1. In the cases of these examples, the control unit 13 judges that neither of the proximate base station apparatuses 10-1, 10-2 is adjacent to the newly installed base station apparatus 10-0, and does not register the information for the proximate base station apparatuses 10-1, 10-2 in the adjacent cell list 130 (S17'). Or, the control unit 13 may register, in the adjacent cell list 130, the information relating to the two proximate base station apparatuses 10-1, 10-2, in the order of the above-described distance from the newly installed base station apparatus 10-0 (S17'). Further, the control unit 13 may delete the information relating to the proximate base station apparatuses 10-1, 10-2 from the adjacent cell list 130. In this way, the control unit 13 of the newly installed base station apparatus 10-0 may add the above-described radio wave direction and compass direction to the distance in judging whether to perform the registration in the adjacent cell list 130.

Further, the control units 13 of each of the proximate base station apparatuses 10-1 to 10-317 may perform this adjacency judgment (S13-1 to S13-4), and upon judging adjacency by means of the above-described calculations, may transmit the eNB new-installation response message (S15-1' to S15-3'). In this case, the control units 13 of the proximate base station apparatuses 10-1 to 10-206 transmit the eNB new-installation response message including information as to whether or not the apparatus is adjacent. Based on judgment results, the proximate base station apparatuses 10-1 to 10-317 and the newly installed base station apparatus 10-0 may then update the adjacent cell list 130.

In this way, by taking into consideration not only the actual distance, but also the compass direction to the base station apparatus 10 in question, the antenna output, and similar, the base station apparatus 10 can judge adjacency (S13-1 to S13-4, S17', and similar) more realistically than in the second practical example.

It is known that antenna output declines in inverse proportion to the third or fourth power of the distance (for example, there is a "Hata-Okumura curve" as a relation for the radio wave attainment distance), and such known relations may be used in judgments employing computations of actual attainment distances.

Other Embodiments

In the second and third embodiments, the systems in which the base station apparatus 10 has three cells is explained. For example, there may be one cell, or there may be two, or four, or another plurality of cells. In this case, the base station apparatus 10 may includes antennas corresponding to the number of cells.

A radio communication system, base station apparatus, terminal apparatus, and communication link setting method in a radio communication system can be provided. Further, a radio communication system in which signal links can be established automatically between adjacent base stations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:
1. A radio communication system, comprising:
a first base station apparatus;
a second base station apparatus; and
a terminal apparatus, wherein
radio communication is performed between the first and second base station apparatuses and the terminal apparatus,
the first base station apparatus includes:
a first position information acquisition unit which acquires position information of the first base station apparatus;
a first control unit which generates a new-installation massage including the position information and indicating that the first base station apparatus is a newly installed base station apparatus and transmits a message to the second base station apparatus, transmits a signal link establishment request message to each the second base station apparatus in a number capable of transmitting to the terminal apparatus as adjacent cell information when the first base station apparatus receives a new-installation response message responding to the new-installation message from the second base station apparatus, generates the adjacent cell information indicating that the second base station apparatus transmitted a signal link establishment response message is an adjacent base station apparatus when the first base station apparatus receives the signal link establishment response message responding to the signal link establishment request message from the second base station apparatus, and transmits to the second base station apparatus a removal request message to remove communication link with the second base station apparatus not used in handover and deletes, from the adjacent cell information, information relating the second base station apparatus which is transmission destination of the removal request message when the handover is not performed within a fixed interval; and a transmission unit which transmits the adjacent cell information to the terminal apparatus, and wherein the terminal apparatus includes a reception unit which receives the adjacent cell information.

2. The radio communication system according to claim 1, wherein the second base station apparatus further includes:
  a second position information acquisition unit which acquires position information of the second base station apparatus; and
  a second control unit which calculates a distance between the second base station apparatus and the first base station apparatus based on the position information of the second base station apparatus and the position information of the first base station apparatus included in the new-installation message, and judges whether the second base station apparatus is adjacent or not to the first base station apparatus by comparing the distance with a threshold value.

3. The radio communication system according to claim 2, wherein the second control unit adds to the criteria for judging adjacency a radio wave transmission direction and a compass direction of the second base station apparatus with respect to the first base station apparatus.

4. The radio communication system according to claim 2, wherein the second control unit transmits to the first base station apparatus the new-installation response message indicating that the second base station apparatus is adjacent to the first base station apparatus when the distance is equal to or less than the threshold value.

5. The radio communication system according to claim 4, wherein the second control unit transmits the new-installation response message including the position information of the second base station apparatus and identification information of the second base station apparatus.

6. The radio communication system according to claim 1, wherein
  the first control unit further includes a first adjacent cell list, and
  the first control unit registers, in the first adjacent cell list, the information relating to the second base station apparatus in order starting with the second base station apparatus in the shortest distance from the first base station apparatus, based on the position information of the second base station apparatus included in the new-installation response message and the position information of the first base station apparatus.

7. The radio communication system according to claim 6, wherein the first control unit registers in order, in the first adjacent cell list, the information relating to the second base station apparatus, based on the distance between the second base station apparatus and the first base station apparatus, and based on radio wave transmission direction and compass direction of the second base station apparatus with respect to the first base station apparatus.

8. The radio communication system according to claim 7, wherein the first control unit registers, in the adjacent cell list, the information relating to the second base station apparatus in the number capable of transmitting to the terminal apparatus as the adjacent cell information.

9. The radio communication system according to claim 6, wherein the first control unit transmits the signal link establishment request message to the second base station apparatuses registered in the first adjacent cell list.

10. The radio communication system according to claim 9, wherein the first control unit transmits the signal link establishment request message including handover-related information of the first base station apparatus.

11. The radio communication system according to claim 10, wherein
  the second control unit includes a second adjacent cell list, and
  the second control unit registers, in the second adjacent cell list, handover-related information of the first base station apparatus included in the signal link establishment request message, when the second base station apparatus receives the signal link establishment request message.

12. The radio communication system according to claim 11, wherein the second control unit transmits to the first base station apparatus the signal link establishment response message including handover-related information of the second base station apparatus, when the second base station apparatus receives the signal link establishment request message.

13. The radio communication system according to claim 1, wherein the first control unit judges that the handover is not performed, and transmits the removal request message to the second base station apparatus, when the first base station apparatus does not receive from the terminal apparatus handover request signal indicating connection target of which is the second base station apparatus and does not transmit a handover request message to the second base station apparatus, or when the first base station apparatus does not receive the handover request message from the second base station apparatus, within the fixed interval.

14. The radio communication system according to claim 1, wherein the first control unit judges that the handover is not performed, and transmits the removal request message to the second base station apparatus, when number of a handover request message transmission to the second base station apparatus upon receiving from the terminal apparatus handover request signal indicating connection target of which is the second base station apparatus, or number of the handover request message reception from the second base station apparatus, within the fixed interval, is equal to or less than a threshold value.

15. The radio communication system according to claim 1, wherein the first control unit judges that the handover is not performed, and transmits the removal request message to the second base station apparatus, when the first control unit counts number of a handover request message transmission to the second base station apparatus upon receiving from the terminal apparatus handover request signal indicating connection target of which is the second base station apparatus, or number of the handover request message reception from the second base station apparatus, within each the fixed interval, and the number in the latest fixed interval is "0".

16. A base station apparatus for performing radio communication with a terminal apparatus, the base station apparatus comprising:
   a first position information acquisition unit which acquires position information of the base station apparatus;
   a first control unit which generates a new-installation massage including the position information and indicating that the base station apparatus is a newly installed base station apparatus and transmits the message to an existing base station apparatus connected to the base station apparatus, transmits a signal link establishment request message to each the existing base station apparatus in the number capable of transmitting to the terminal apparatus as adjacent cell information when the base station apparatus receives a new-installation response message responding to the new-installation message from the existing base station apparatus, generates the adjacent cell information indicating that the existing base station apparatus transmitted a signal link establishment response message is an adjacent base station apparatus when the base station apparatus receives the signal link establishment response message responding to the signal link establishment request message from the existing base station apparatus, and transmits to the existing base station apparatus a removal request message to remove communication link with the existing bas station apparatus not used in handover and deletes, from the adjacent cell information, information relating to the existing base station apparatus which is transmission destination of the removal request message when the handover is not performed within a fixed interval; and
   a transmission unit which transmits the adjacent cell information to the terminal apparatus.

17. A base station apparatus for performing radio communication with a terminal apparatus, the base station apparatus comprising:
   a second position information acquisition unit which acquires position information of the base station apparatus;
   a second control unit which calculates a distance between a new installation base station apparatus and the base station apparatus based on position information of the new installation base station apparatus included in a new-installation message and position information of the base station apparatus when the base station apparatus receives from the new installation base station apparatus the new-installation message indicating a newly installed base station apparatus and transmits to the new installation base station apparatus a new-installation response message indicating that the base station apparatus is adjacent to the new installation base station apparatus if the distance is smaller than a threshold value, generates adjacent cell information indicating that the new installation base station apparatus is an adjacent base station apparatus and transmits a signal link establishment response message responding to a signal link establishment request message to the new installation base station apparatus when the bas station apparatus receives the signal link establishment request message from the new installation base station apparatus, and deletes information relating to the new installation base station apparatus from the adjacent cell information when the base station apparatus receives from the new installation base station apparatus a removal request message to request removal of signal link; and
   a transmission unit which transmits the adjacent cell information to the terminal apparatus.

18. A terminal apparatus for performing a radio communication with a base station apparatus, the terminal apparatus comprising:
   a reception unit which receives from the base station apparatus adjacent cell information indicating that an existing base station apparatus transmitted a signal link establishment response message is an adjacent base station apparatus, if the base station apparatus generates a new-installation massage including position information of the base station apparatus and indicating that the base station apparatus is a newly installed base station apparatus and transmits the message to the existing base station apparatus which is an existed other base station apparatus, transmits a signal link establishment request message to each the existing base station apparatus in a number capable of transmitting to the terminal apparatus as adjacent cell information when the base station apparatus receives a new-installation response message responding to the new-installation message from the existing base station apparatus, and receives the signal link establishment response message responding to the signal link establishment request message from the existing base station apparatus; wherein
   the reception unit transmits to the existing base station apparatus a removal request message to remove communication link with the existing base station apparatus not used in handover when the handover is not performed within a fixed interval, and receives the adjacent cell information from which information relating the existing base station apparatus is deleted, and the existing base station apparatus is transmission destination of the removal request message.

19. A communication link setting method in a radio communication system form performing radio communication between a first and second base station apparatuses and a terminal apparatus, the method comprising:
   acquiring position information of the first base station apparatus, by the first base station apparatus;
   generating a new-installation massage including the position information and indicating that the first base station apparatus is a newly installed base station apparatus and transmitting the message to the second base station apparatus, by the first base station apparatus;
   transmitting a signal link establishment request message to each the second base station apparatus in the number capable of transmitting to the terminal apparatus as adjacent cell information, when the first base station apparatus receives a new-installation response message responding to the new-installation message from the second base station apparatus, by the first base station apparatus;
   generates the adjacent cell information indicating that the second base station apparatus transmitted a signal link establishment response message is an adjacent base station apparatus and transmitting to the terminal apparatus, when the first base station apparatus receives the signal link establishment response message responding to the signal link establishment request message from the second base station apparatus, by the first base station apparatus; and transmitting to the second base station apparatus a removal request message to remove communication link with the second bas station apparatus not used in handover and deleting, from the adjacent cell information, information relating the second base station apparatus which is transmission destination of the removal request message, when the handover is not performed within a fixed interval, by the first base station apparatus.

20. A communication link setting method in a radio communication system for performing a radio communication with a first and second base station apparatuses and a terminal apparatus, the method comprising:

acquiring position information of the second base station apparatus, by the second base station apparatus;

calculating a distance between the second base station apparatus and the first base station apparatus based on position information of the first base station apparatus included in a new-installation message and position information of the second base station apparatus when the second base station apparatus receives from the first base station apparatus the new-installation message indicating a newly installed base station apparatus and transmitting to the first base station apparatus a new-installation response message indicating that the second base station apparatus is adjacent to the first base station apparatus if the distance is smaller than a threshold value, by the second base station apparatus;

generating adjacent cell information indicating that the first base station apparatus is an adjacent base station apparatus when the second bas station apparatus receives a signal link establishment request message from the first base station apparatus, transmitting the adjacent cell information to the terminal apparatus, and transmitting to the first base station apparatus a signal link establishment response message responding to the signal link establishment request message, by the second base station apparatus; and deleting information relating to the first base station apparatus from the adjacent cell information when the second bas station apparatus receives from the first base station apparatus a removal request message to request removal of signal link, by the second base station apparatus.

\* \* \* \* \*